United States Patent [19]

Boldt et al.

[11] 4,171,761
[45] Oct. 23, 1979

[54] WAVE SOLDER APPARATUS

[75] Inventors: Robert L. Boldt; George R. Wood, Jr., both of Richardson, Tex.

[73] Assignee: Rockwell International Corporation, El Segundo, Calif.

[21] Appl. No.: 888,091

[22] Filed: Mar. 20, 1978

[51] Int. Cl.² .......................... B23K 1/08; B23K 3/06; H05K 3/34
[52] U.S. Cl. ..................................... 228/37; 118/410; 118/422; 228/180 R; 228/260
[58] Field of Search ................. 228/37, 34, 36, 180 R, 228/260; 118/422, 429, 410

[56] References Cited

U.S. PATENT DOCUMENTS

| | | | |
|---|---|---|---|
| 2,993,272 | 7/1961 | Carlzen | 228/37 |
| 3,398,873 | 8/1968 | Wegener | 228/37 |
| 3,921,888 | 11/1975 | Elliott | 228/37 |
| 3,990,621 | 11/1976 | Boynton | 228/37 |
| 4,046,105 | 9/1977 | Gomez | 118/429 |

Primary Examiner—Francis S. Husar
Assistant Examiner—Gene P. Crosby
Attorney, Agent, or Firm—Bruce C. Lutz; Howard R. Greenberg; H. Fredrick Hamann

[57] ABSTRACT

Apparatus is disclosed herein for extending the length of a trailing wave of a double sided laminar wave of solder by the use of a dam in an oil intermix wave soldering system to create a dead zone while still being able to remove oil from the surface of the dead zone area on a continuous basis to prevent contaminants from interfering with soldering operations.

6 Claims, 4 Drawing Figures

WAVE SOLDER APPARATUS

THE INVENTION

The present invention is concerned generally with soldering and more specifically with wave soldering. Even more specifically the invention is concerned with the method of and apparatus for extending the trailing edge or wave of a double wave flow of solder to provide a dead zone while still drawing the contaminants, including oil, off the surface of the dead zone area solder.

There has been considerable art developed in wave soldering nozzles and devices. A wave soldering device of the type which was modified by the present invention to extend the trailing wave is illustrated in a Wegener et al U.S. Pat. No. 3,398,873. Part of the reason for extending the length of the trailing wave is to keep the solder on the printed circuit board from cooling too fast after the soldering occurs. By having a long trailing wave, there is considerable heat generated above the surface of the solder and this heat continues to increase the temperature of the remaining part of the board and prevents the cooling of the solder on the board so fast thereby minimizing "frozen" joints. This approach also helps prevent "icicles" from forming on the lower surface of the board. Such an extended trailing edge nozzle is shown in a Carlzen et al U.S. Pat. No. 2,993,272. It has also been found that it is desirable to have a dead zone or pool of near stationary solder at the point that the board exits the solder material even though it is desirable to have a high velocity of solder striking the board in a washing action where the board enters the solder wave. Removal of the board from the solder in this dead zone also helps prevent icicles and excess solder deposits. An example of such an approach is illustrated in a Gomez U.S. Pat. No. 4,046,105. Further, several companies, such as the Hollis Engineering Company who is the assignee of the first-mentioned Wegener et al patent, uses an oil intermix system which is claimed to enhance soldering, and improve the reliability of printed circuits by reducing bridging between printed circuit paths and icicling.

Although the Gomez patent illustrates a dead zone of solder, it does not have a long trailing wave. Further, the Gomez patent is not interested in an oil intermix system and thus is not concerned with removing oil and other contaminants from the dead zone. As is well known to those skilled in the art, the oil in the dead zone upon continued application to high temperatures exhibits oxidation and thus forms sludge. Wherever the solder itself in molten form is exposed to the air, dross (the oxides of tin and lead) is formed. Oil is a scavenger for dross and absorbs it without harmful effects to the solder itself. In the most desirable form of the system, oil rising to the surface of the molten solder would be continuously drawn off before the surface oil contained enough contaminants to produce defects in the printed circuit board.

The present inventive concept illustrates a method for accomplishing the desired effects of having a long trailing wave, a dead zone of solder, and means for drawing the oil off the surface of the solder on a continuing basis. The longer trailing wave is accomplished by attaching a wave extender to the trailing wave edge of a nozzle such as shown in the Wegener et al patent and closing the sluice gate such that very little solder is permitted to flow past the sluice gate on the trailing edge of the solder wave. The solder instead is forced to flow into the attached device which has a weir containing a multiplicity of spillways. The weir is designed to have a level higher than the containing edges of the original nozzle which weir permits a greater depth of solder from the nozzle, alters the flow action of the solder so as to create a dead zone, and has spillways designed such that the oil is drawn off the surface of the solder rather than being kept on the solder surface. While one would believe that the surface oil would normally flow over the top of any weir, it has been found that the weight of the solder is such that it flows down into any reservoir and then back up the side of any weir before going over the top of the weir. This unique action, apparently due to the weight of the solder, creates a turbulence which in a normal flat weir or dam situation prevents surface oil from flowing over the top of the weir. However, the special design of a weir having spillways interferes with the normal solder action and creates a venturi type action so as to draw the oil off the surface of the solder.

In view of the above it is an object of the present invention to provide an improved wave soldering design.

Other objects and advantages of the present invention may be ascertained from a reading of the specification and appended claims in conjunction with the drawings wherein:

DETAILED DESCRIPTION

Figure 1:
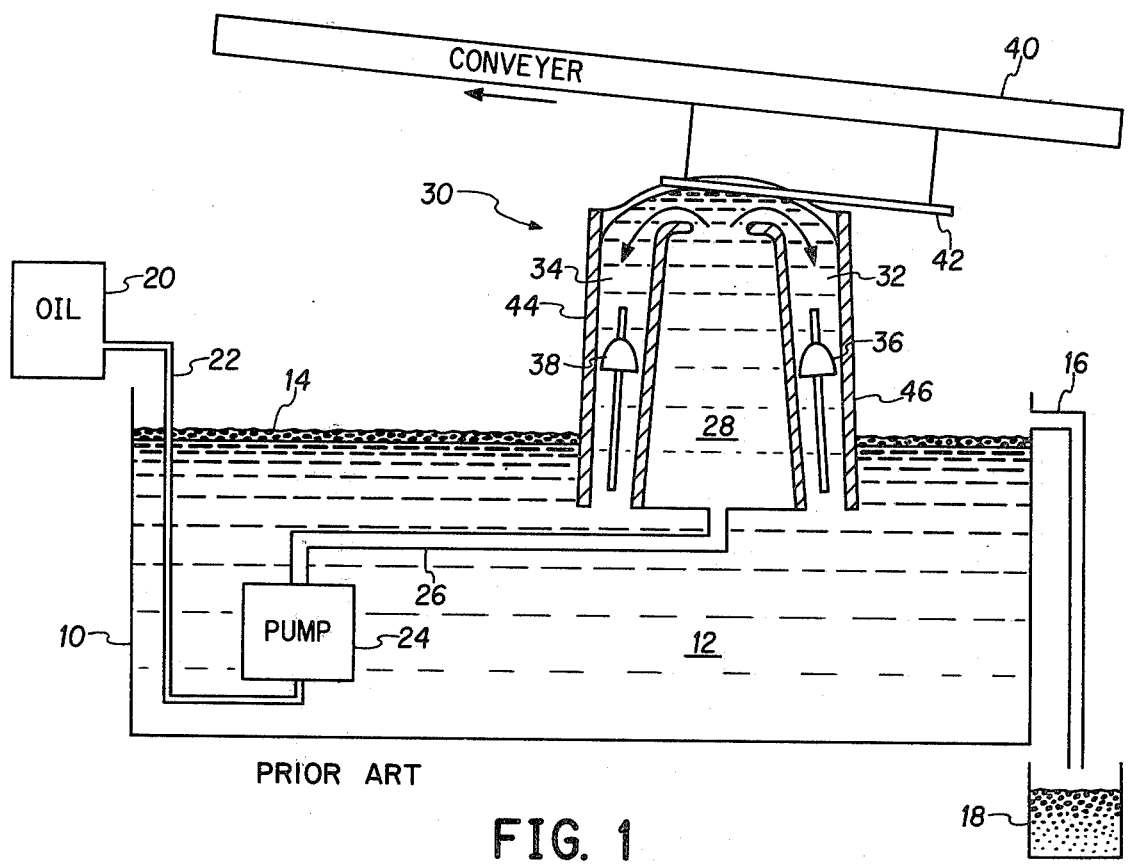
FIG. 1 is a diagrammatic view of an entire wave soldering system showing a nozzle of the type illustrated in the Wegener et al patent.

In FIG. 1 a container 10 contains a volume of solder generally designated as 12 having a surface layer of oil and dross 14 and an overflow pipe 16. Whenever the oil-dross and/or solder in the container 10 is too high, it overflows through pipe 16 into a container 18. A source or reservoir of oil 20 supplies oil through a line 22 to a pump 24 located in the solder 12 of the container or solder pot 10. Pump 24 pumps the solder 12 as well as oil from reservoir 20 through a conduit 26 to an interior or central portion 28 of a solder wave nozzle generally designated as 30. The solder flows upwardly and at the top diverts in two directions (bidirectionally) wherein it flows back down the right-hand side 32 as an advance wave and flows down the left-hand side 34 as the trailing wave. In diagrammatic form a sluice gate adjustable restriction or valve 36 is shown restricting the passage of solder down the side 32 between portion 28 and a side 46 and a further sluice gate 38 is shown restricting the passage of solder down the side 34 between portion 28 and a side 44. By adjusting the two sluice gates 36 and 38, the amount of solder in the advance and trailing portions of the wave can be proportioned in the desired manner. A conveyer 40 is illustrated moving in the direction from right to left and carries a printed circuit board 42 which is illustrated as entering the solder wave in the advance area so as to be subjected to a scrubbing action and leaving the solder somewhere near the center of the two waves so as to be subjected to a minimum amount of solder movement action.

It should be mentioned that the solder is returned to the solder pot below the surface of the solder since the dropping of or splashing of solder directly unto the top layer of oil 14 causes the oil to be churned up and filled with air bubbles thereby producing objectionable foam. This is outlined in detail in the referenced Wegener patent.

Figure 2:
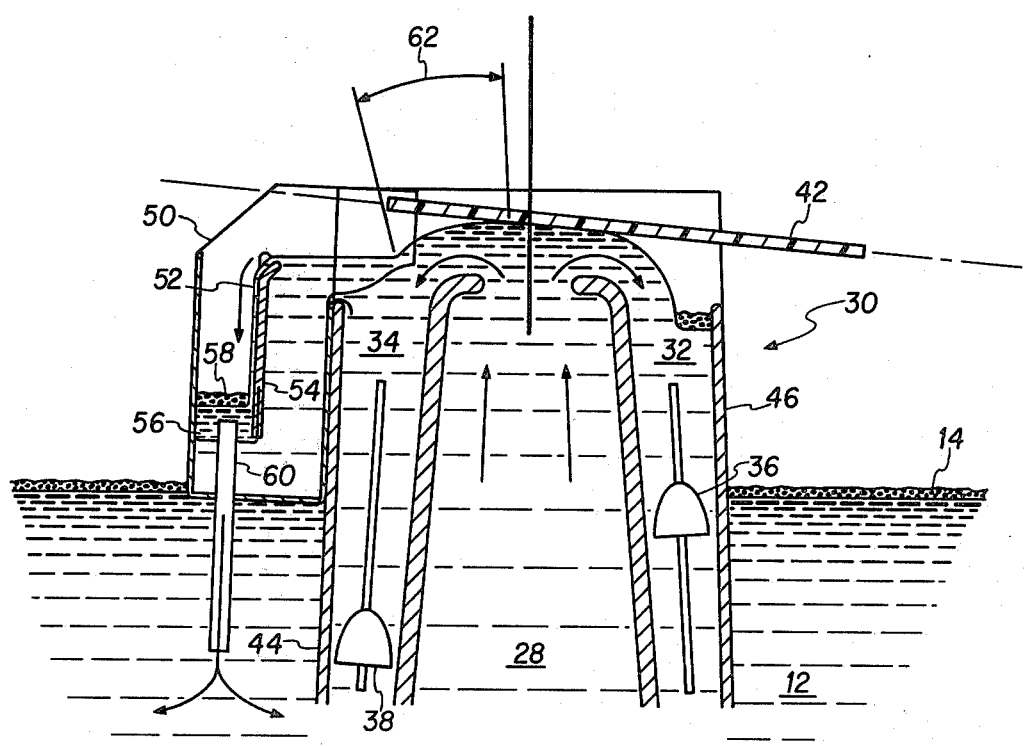
FIG. 2 illustrates a portion of the apparatus of FIG. 1 with the addition of the present invention to alter the solder flow patterns.

In FIG. 2 the same numbers are used as illustrated in FIG. 1 where applicable. In addition to that shown in FIG. 2 a wave extender generally designated as 50 is hung on the side 44 of the trailing edge of nozzle 30. The sluice gate 38 is adjusted to near the minimal flow condition so as to require most of the solder to flow over the top of a weir 54 in a stream shown as 52. Much of the solder returns to the pot 10 is this manner rather than through or past sluice gate 38. A catch basin, reservoir or area 56 within wave extender 50 contains a pool of solder with an amount of dross 58 on the surface thereof. The solder and dross are passed via a plurality of conduits 60 beolow the surface of the solder 12 where it is reintroduced to the solder 12 of pot 10. In some embodiments of the invention, solder can also flow through other openings in weir 54 to enter the area 56 in addition to the solder flowing over the spillways 52 in weir 54. The weir 54 introduces a dead zone generally designated as 62 and defined by the width of the arrows attached to this label. The weir 54 also raises the height of the wave thus allowing longer leads to be used on the printed circuit board without the leads touching the solder nozzle.

Figure 3:
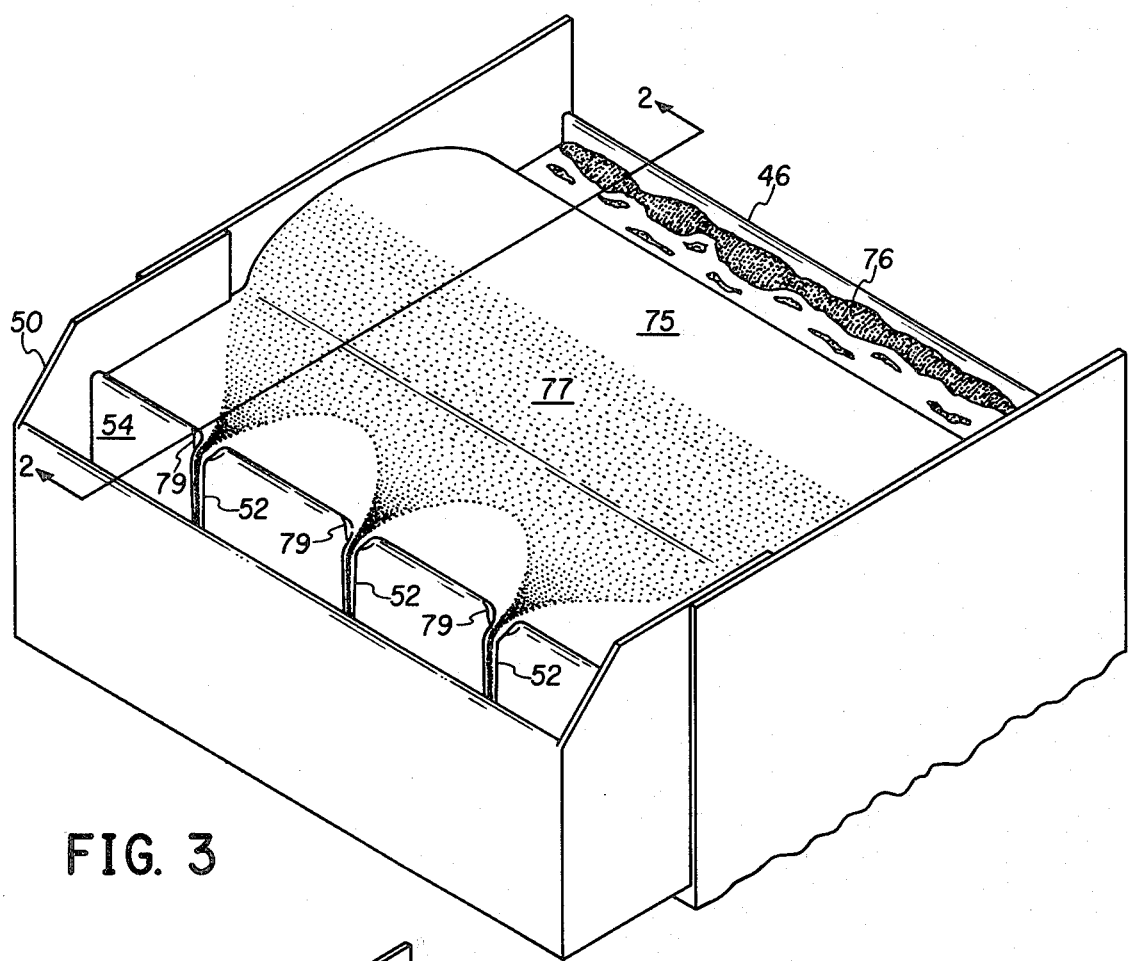
FIG. 3 is an isometric view showing the action and interaction of the oil with the solder in the wave forming portion of an operating system.

In FIG. 3 an isometric view of the solder nozzle and a wave extender of the embodiment illustrated in the present invention is shown although the conduits 60 have not been illustrated since their operation is very apparent. The advance portion of the solder wave is given a designation of 75 and this flows from the central portion of the nozzle into the right-hand side where a large amount of dross 76 can be seen floating on the surface of the solder adjacent side 46. While the oil is intermixed with the solder as it is supplied from the pump 24, the dead zone allows the oil to separate from the solder and form on the surface of the trailing wave. There is also some oil on the surface of the advance wave 75 but this is not illustrated since this oil is continually washed into the portion 32 of the nozzle by the flowing solder and carried back to the solder pot. The trailing edge portion or trailing wave designated as 77 contains surface oil illustrated in the drawing as a large plurality of dots. As mentioned before, if the weir 54 were flat and allowed the solder to flow over the top, the weight of the solder brings the solder down into the reservoir created by the weir 54 and it comes back up the inside surface of the weir, flows over the top and back down into the second reservoir 56. This peculiar action of the solder creates a turbulence which prevents the oil on the surface from flowing over the top of a level weir and being returned to the solder pot. A plurality of spillways generally designated as 79 are illustrated. These spillways allow the solder to drop to the bottom of the reservoir 56 and return to the solderpot. However, since solder is not flowing over the top of the weir the action mentioned supra does not occur. Instead the solder on the surface of the trailing wave 77 is drawn in a sort of venturi action toward the spillways 79. This venturi action draws the oil and any contaminants on the surface along with the solder and thus the oil and any contaminants are continually drawn from the trailing wave and in particular from the dead zone to be returned to the solder pot. A pair of cross section lines 2—2 in FIG. 3 illustrate the cross section taken for illustrating FIG. 2.

Figure 4:
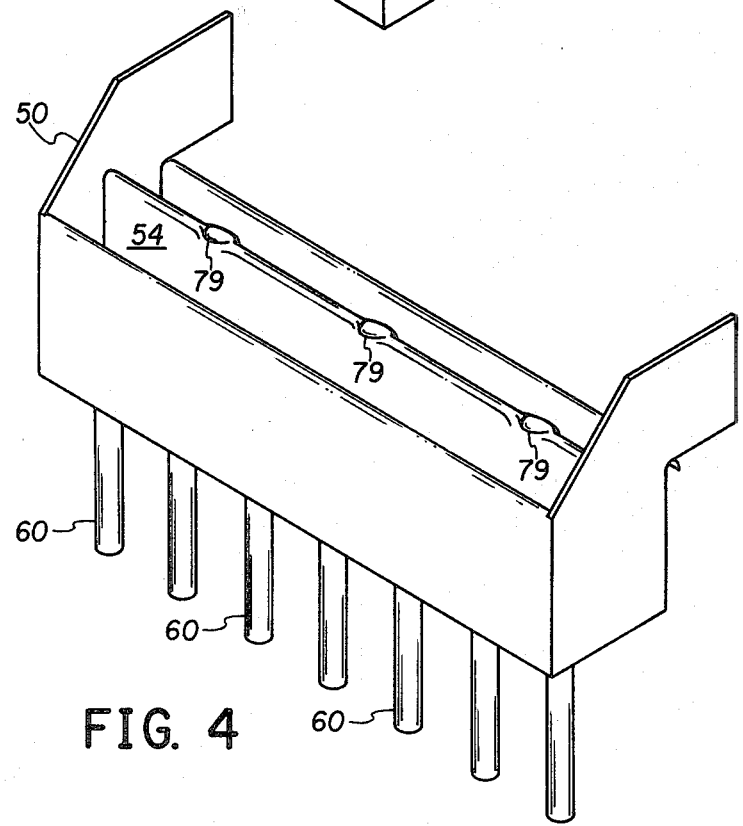
FIG. 4 illustrates in an isometric view the apparatus which is physically added to the nozzle of FIG. 1 to perform the present function.

In FIG. 4 the wave extender 50 is again illustrated using the same numbers as used previously in FIGS. 2 and 3 and further designators are not believed necessary.

OPERATION

While the operation of the system is believed apparent from all the description above, the operation will be again described as to both the prior art of FIG. 1 and the modification of FIG. 2. The oil from reservoir 20 is mixed with solder from reservoir 10 by a pump 24 and supplied to a central portion 28 of a solder wave nozzle or device 30. In this solder wave device the solder is divided into advance and trailing waves wherein the proportion of solder in each wave is partially determined by the adjustment of the slice gates 36 and 38. A printed circuit board to be soldered enters the advance wave where the advance wave provides a scrubbing action to clean the board. The board then leaves in a less turbulent portion of the wave which is termed the trailing edge or trailing wave portion of the solder. As illustrated, the prior art does not have the solder overflowing the sides 44 and 46 into the solder pot since this would create a foaming action. Rather, the solder is returned to below the surface of the pot. The oil intermixed with the solder prevents dross from forming on the surface of the solder. However, as the oil separates from the solder and goes to the surface it does create a sludge which comprises oxidized oil, dross and other contaminants which are obtained from the surface of board 42. Some of these contaminants are also contained in the solder 12 itself.

As illustrated in FIG. 2, the trailing wave is extended by the use of weir 54 of wave extender 50. The weir 54 increases the height of the solder wave and creates a dead zone 62. While the exit area of board 42 in FIG. 1 is less turbulent than the entrance area, it is not completely a dead zone and thus bridging of solder paths and icicles occur thereby preventing the production of 100% perfectly soldered boards. The dead zone 62 of FIG. 2 is an area of substantially no solder movement thus reducing the possibility of bridging defects. The dead zone also improves "peel back" which as used herein refers to the action of dynamic solder creating icicles and removing or pulling solder out of plated through holes. The hot solder area is of course much larger in FIG. 2 and heat radiating from the surface of the solder continues to increase the temperature of the board 42 to prevent the fast cooling of the solder on the surface of the board so as to minimize the chance that frozen solder joints may occur. The radiated heat also reduces the amount of icicling. As previously indicated, the sluice gate 38 is adjusted so that substantially no solder flows through this return path to the solder pot. Rather, most of the solder flows over the spillway 79 of the weir 54 or passes through other openings in the weir 54 to the reservoir 56 before returning to the solder pot through conduits 60.

As part of the inventive concept, the spillways 79 are designed to create a venturi action in the solder and draw the oil off the surface of the trailing wave of the solder and in particular off the dead zone 62 to prevent the dross and other contaminants in this oil from causing defects in the manufacturing process. It may be noted that in operation each board 42 passing through the solder pushes surface oil in the dead zone forward such that it enters the area of more rapidly moving surface solder which additionally helps move the oil into the area of the spillways 79 for removal to the solder pot.

While the present trailing wave extender has been shown as an attachment to an already existing device such as the wave soldering equipment of Hollis Engineering Company, it is apparent that the solder nozzle can be redesigned so that the trailing wave can be lengthened through the use of a weir with spillways for drawing the oil off the surface of the solder and wherein both the oil and the solder of the trailing wave are returned below the surface of the solder in the pot 10.

Since it is obvious that there are many ways in which the inventive concept can be implemented, we rely on the scope of the descriptions appended wherein we claim:

1. In wave soldering apparatus of the type which supplies a mixture of solder and oil in the form of a bidirectional wave having solder flowing in the opposite directions defined as advance and trailing areas wherein devices to be soldered enter the solder in the advance area and exit the solder near the trailing area of the solder wave, the inventive addition of:
   weir means restricting the normal flow of solder in the trailing area of the solder wave for creating a dead zone on the surface thereof, wherein said weir means includes a multiplicity of spillway means for drawing contaminants, in a venturi type action, off the surface of the solder as the solder flows over said spillway means of said weir means.

2. Wave soldering apparatus comprising, in combination:
   solder supply means for providing advance and trailing wave flows of solder wherein objects enter said advance wave to receive a scrubbing action by the solder and leave in the area of said trailing wave; and
   solder flow restriction means for creating a dead zone in said trailing wave to improve the "peel back" of soldered objects leaving the solder, said restriction means including a weir means having a spillway means for drawing contaminants, in a venturi type action, off the surface of the solder as the solder flows over said spillway means of said weir means.

3. Apparatus as claimed in claim 2 comprising, in addition:
   means for transporting devices to be soldered by said soldering apparatus, the devices entering the solder in the advance wave area and leaving the solder in the dead zone of said trailing wave.

4. Wave soldering apparatus of the type including solder wave extender means for supplying solder to form advance and trailing solder waves, baffle means for extending the length of the trailing wave to create a dead zone, means for returning solder flowing from the solder waves to a solder pot and means for passing printed circuit boards to be soldered into the solder in the area of said advance wave and removing the printed circuit boards from the solder in the area of the trailing wave comprising the inventive addition of:
   means incorporated in said baffle means for drawing contaminants, in a venturi type action, off the surface of said trailing wave.

5. Apparatus as claimed in claim 4 wherein said baffle means includes means for removing contaminants from the surface of said trailing wave and returning same to the solder pot below the surface of solder in the pot.

6. Wave soldering apparatus comprising, in combination:
   solder supply means for providing advance and trailing wave flows of solder; and
   trailing wave restriction means for creating a dead zone in said trailing wave, said restriction means including a weir means having spillway means for drawing contaminants off the surface of the solder, in a venturi type action, as the solder flows over said spillway means of said weir means.

* * * * *